(12) United States Patent
Yamashita (10) Patent No.: US 8,421,293 B2
(45) Date of Patent: Apr. 16, 2013

(54) METHOD OF RARE EARTH-IRON BASED ANNULAR MAGNET AND MOTOR FABRICATED THEREBY

(75) Inventor: Fumitoshi Yamashita, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 199 days.

(21) Appl. No.: 12/999,727

(22) PCT Filed: Jul. 16, 2008

(86) PCT No.: PCT/JP2008/062843
§ 371 (c)(1),
(2), (4) Date: Jan. 5, 2011

(87) PCT Pub. No.: WO2010/007673
PCT Pub. Date: Jan. 21, 2010

(65) Prior Publication Data
US 2011/0121675 A1    May 26, 2011

(51) Int. Cl.
*H02K 15/03* (2006.01)
*H02K 1/27* (2006.01)
*H02K 21/22* (2006.01)
*H02K 23/04* (2006.01)

(52) U.S. Cl.
USPC ............ 310/156.43; 310/156.38; 310/156.45; 148/104; 29/598; 29/608; 29/609

(58) Field of Classification Search ............ 310/156.43, 310/156.38, 156.45, 43; 148/301, 104, 120; 29/608, 609, 598; *H02K 23/04, 21/22, 1/27, H02K 15/03*
See application file for complete search history.

(56) References Cited

U.S. PATENT DOCUMENTS

| | | | |
|---|---|---|---|
| 5,474,623 A | * | 12/1995 | Ma et al. ................. 148/104 |
| 2002/0180295 A1 | * | 12/2002 | Kaneda et al. ........... 310/156.43 |
| 2005/0093390 A1 | * | 5/2005 | Komuro et al. .......... 310/156.43 |

FOREIGN PATENT DOCUMENTS

| | | |
|---|---|---|
| JP | A-2004-259850 | 9/2004 |
| JP | A-2007-215342 | 8/2007 |
| WO | WO 2007/119393 A1 | 10/2007 |

OTHER PUBLICATIONS

Schulze, J. "Application of High Performance Magnets in Small Motors," *Proc. of the 18th International Workshop on High Performance Magnets and Their Applications*, 2004, pp. 908-915.

Pang, Y. et al., "Comparison of Brushless Motors Having Halbach Magnetized Magnets and Shaped Parallel Magnetized Magnets, " *Proc. of the 18th International Workshop on High Performance Magnets and Their Applications*, 2004, pp. 400-407.

(Continued)

*Primary Examiner* — Tran Nguyen
*Assistant Examiner* — Michael Andrews
(74) *Attorney, Agent, or Firm* — Oliff & Berridge, PLC (57) ABSTRACT

Improvement of torque densities, miniaturization and weight saving for outer rotor type motors or permanent-magnet-field-type DC motors can be efficiently achieved by high-energy densification of a magnet. However, torque pulsation or armature reaction gives negative influences thereto. Further, in application of a slotless (coreless) structure eliminating the torque pulsation or the armature reaction, the magnetic resistance of motor magnetic circuits will be enhanced. For solving the above problems, there is provided an annular magnet that is opened in a reverse direction relative to the opening direction of a U-shaped segment fabricated in constantly-directed magnetic fields, the annular magnet having an anisotropic distribution where angles relative to inner peripheral tangent lines can be continuously changed in the range of approximately 0 to 90 degrees, and having energy density $(BH)_{max}$ of 160 to 186 kJ/m$^3$.

8 Claims, 7 Drawing Sheets

OTHER PUBLICATIONS

Yamashita, F. et al., "Preparation Method of Rare Earth Bonded Magnets With Continuously Controlled Anisotropy Directions," *Journal of Applied Physics*, 2007, pp. 09K522-1-09K522-3, vol. 101.

Yamashita, F. et al., "Composite Bonded Magnets With Controlled Anisotropy Directions Prepared by Viscous Deformation Technique," *Journal of Magnetism and Magnetic Materials*, 2007, pp. e101-e104, vol. 316, No. 2.

Rabin, B.H. et al., "Recent Developments in NdFeB Powder," *120th Topical Symposium of the Magnetic Society of Japan*, 2001, pp. 23-30.

Ma, B.M., "Recent Powder Development at Magnequench," *Polymer Bonded Magnets 2002*, 2002, pp. 1-39.

Hirosawa, S. et al., "Structure and Magnetic Properties of $Nd_2Fe_{14}B/Fe_xB$-Type Nanocomposites Prepared by Strip Casting," *IEEE Transactions on Magnetics*, Jul. 2004, pp. 2883-2885, vol. 40, No. 4.

Davies, H.A. et al., "Nanophase Pr and Nd/Pr-Based Rare Earth-Iron-Boron Alloys," *Proc. of the 16th International Workshop on Rare-Earth Magnets and Their Applications*, 2000, pp. 485-495.

International Search Report issued in International Application No. PCT/JP2008/062843 on Oct. 21, 2008 (with translation).

\* cited by examiner

|  | (BH)max kJ/m³ | Mr T | HcJ MA/m | Hk/HcJ |
|---|---|---|---|---|
| Prepared magnet | 186.8 | 1.037 | 0.88 | 0.495 |
| Isotropic NdFeB | 79.7 | 0.704 | 0.721 | 0.318 |

FIG. 7

Annular Magnet Delivery Surface | Dice/Center Core Sectional Surface | Segment Insertion Surface

METHOD OF RARE EARTH-IRON BASED ANNULAR MAGNET AND MOTOR FABRICATED THEREBY

TECHNICAL FIELD

The present invention relates to the manufacturing method of an annular magnet satisfying that, when the mechanical radian of a magnetic pole is ϕ, and an anisotropic angle relative to a tangent of the magnetic pole in an inner circumferential direction is M θ, M θ is adapted to continuously vary relative to ϕ. Further, the present invention also relates to a motor using the above-described method. To be more specific, the present invention relates to the manufacturing method of a rare earth-iron based annular magnet and a motor using this method that have high energy density in order to miniaturize and torque-densify so-called outer-rotor type motor or permanent-magnet-field-type DC motor with less than several watts that has been widely used as all sorts of driving sources for electric and electronic apparatuses, etc. Furthermore, the rare earth-iron based annular magnet and the motor using the method satisfy continuously control the direction of anisotropy.

BACKGROUND ART

A motor is identifiable as a complex function member where rotors, axes, bearings, stators, etc. are finished with various materials such as steels, non-ferrous metals, polymers in precision manners and assembled to convert electric energy into mechanical energy. In recent years, the mainstream of a motor is becoming a permanent-magnet type motor with a magnet carrying abilities to attract or repel other magnetic materials, and to permanently generate static magnetic fields without external energy. In a physical point of view, a point where a magnet is different form other magnetic materials is that the magnet keeps practicable magnetization after external magnetic fields are eliminated, and flux reversal (Demagnetization) will occur first when heat or relatively large reverse magnetic fields are applied causing decline of magnetization along therewith. Considering important property values of these magnets, energy density $(BH)_{max}$ can be named. This energy density $(BH)_{max}$ indicates the potential energy of a magnet per unit volume.

Here, ability of a magnet allowing strong attraction or repulsion does not necessarily lead to high-performability of the magnet depending on kinds of motors. However, according to Non-Patent Document 1, in relation with remanent flux density Br that is one of the basic properties of a magnet and motor constant KJ that is the barometer of a motor performance (KJ is a ratio between output torque KT and a square root √R of ohmic loss), when a motor diameter, a rotor diameter, a clearance, a soft magnetic material, a magnetic dimension, etc. are fixed, it is supposed to be able to obtain higher torque density along with increase of energy density $(BH)_{max}$ of a magnet in an inner rotor type brushless motor or a slotless (coreless) motor that applies an annular magnet to which the present invention is subjected.

However, considering the increase of the energy density $(BH)_{max}$, in an outer rotor type brushless motor to which the present invention is subjected to, it would be difficult to obtain the higher torque density compared to the motors hereinabove described. In addition, since the stator core or the armature core of the above-described motors or a permanent-magnet-field-type DC motor is provided with a slot into which a winding is housed and teeth that partially form magnetic circuits, permeance is adapted to be altered along with rotation. Accordingly, the increase of energy density $(BH)_{max}$ of a magnet will raise torque pulsation, that is, cogging torque. The increase of the cogging torque may cause some disturbances such as hampering smooth rotation of a motor, magnifying vibration or noise of the motor or deteriorating rotation controllability.

Therefore, an outer rotor type motor in a slotless (coreless) structure where there is no permeance change along with rotation, and cogging torque is not basically generated is known. However, since the motor has an air-core winding in a clearance between a magnet and an iron core faced thereto, there is a problem as that magnetic resistance in a motor magnetic circuit is notably increased. Accordingly, in a motor magnet with the above structure, a magnet satisfying the following has been thus demanded. That is, along with the increase of so-called energy density $(BH)_{max}$ of a magnet, static magnetic fields that generate magnetic poles as a motor magnetic circuit are adapted to be not consumed as leakage flux the magnetic flux linkage of a stator core teeth or the air-core winding is enhanced, or the direction of anisotropy is continuously controlled in order to decrease the armature reaction of permanent-magnet-field-type DC motors.

Here, there can be found some studies working on the rare earth-iron based magnet that controls the direction of anisotropy as discussed hereinabove and the motor using the same.

For example, Non-Patent Document 2 is subjected to an inner rotor type brushless motor and applies a rare earth-iron based sintered magnet with high energy density where the thickness of the magnet is as thin as 1.2 mm, and its remanence Mr is 1 T. As shown in FIGS. 10(A) to 10(D), a single magnetic pole is composed of fragments where each of magnetic poles is divided into 2 to 5 pieces, and the direction of anisotropy (the direction of an easy magnetization axis) is stepwisely adjusted in every magnetic pole fragment. This is a so-called Halback Cylinder. Here, in FIGS., the subscripts (2) to (5) of a magnetic pole 51 indicate a number of the fragments where the magnetic pole 51 is divided into 2 to 5 pieces. Further, the direction of arrows for each fragment indicates the direction of anisotropy (the direction of the easy magnetization axis).

In consideration of an inner rotor type brushless motor with 12 poles and 18 slots using the above-structured magnetic pole, when determining a relation between a number N of the divided magnetic-pole fragments and cogging torque Tcog based on the values of cogging torques, it is possible to suppose that the power approximation of Tcog=61.753exp(−0.145 N) can be established. To be more specific, when an angle defied by a magnetized vector M in an optional mechanical radian ϕ and a magnetized vector relative to a tangent line of a magnetic pole in an outer circumferential direction is set to M θ, it suggests being ideal that the direction of anisotropy has continuous variations in a regular and precise manner between the magnetic poles. However, considering the rare earth-iron based sintered magnet with high energy density where its thickness is 1.2 mm, and remanence Mr is 1 T, it would be very difficult to obtain a rotor where the plurality of magnetic-pole fragments with anisotropy in different directions are prepared, the magnetic-pole fragments are regularly and finely arranged, and the plurality of magnetic poles are structured with high dimensional precision. Accordingly, it becomes extremely difficult to produce a rotor with a multipolar annular magnet in which to have integral times of magnetic poles, or the inner rotor type brushless motor using the same. Moreover, it would be easy to speculate that the above described rotor be in less economic performance.

Figure 11A:
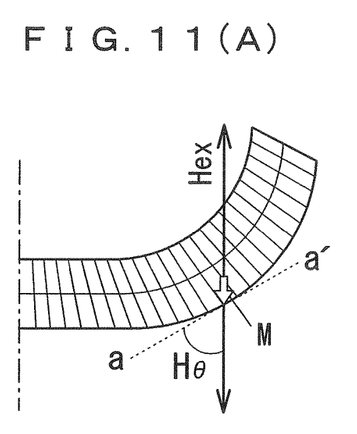
FIG. 11 is a second schematic diagram that indicates the control of a magnetized direction.
Figure 11B:
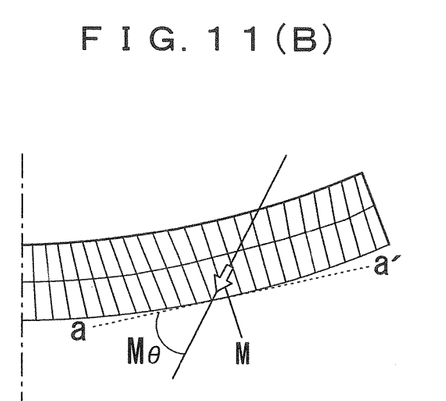

On the other hand, Non-Patent Documents 3 and 4 noticed that the power approximation has been established between the divided magnetic-pole fragments N and the cogging torque Tcog that has been concerned in Non-Patent Document 2. Accordingly, Non-Patent Documents 3 and 4 disclose the manufacturing method of a rare earth-iron based magnet that continuously controls the direction of anisotropy in the same structure of the inner rotor type brushless motor, and disclose effects to reduce cogging torques of the motor based on a magnet that continuously controls the direction of anisotropy. Specifically, as the manufacturing method of a magnet, as shown in FIG. 11(A), an anomalously-outlined segment is prepared, the anomalously-outlined segment being as that an angle H θ defined by a homogeneously aligned magnetic field Hex being kept in a constant direction and tangent lines of the magnetic-pole fragments divided into 96 pieces in inner and outer peripheries is continuously varied from a vertical plane to an in-plane direction. Then, as shown in FIG. 11(B), by applying rheology based on plastic deformation, an arc-segmented magnet with energy density $(BH)_{max}$ of 155 to 158 kJ/m³ is achieved so as to provide a rotor for the inner rotor type brushless motor. Here, Hex and its arrow in FIG. indicate a uniformly aligned magnetic field and its direction; a line a-a' indicates a tangent line in an outer periphery direction at an optional position; M and its arrow indicate a magnetized vector and its direction; H θ indicates an angle defined by a tangent line in a periphery direction and M; and M θ indicates an angle defined by a tangent line in a periphery direction and M. Here, M θ indicates the direction of anisotropy at an optional position, and H θ≈M θ can be established.

Figure 12:
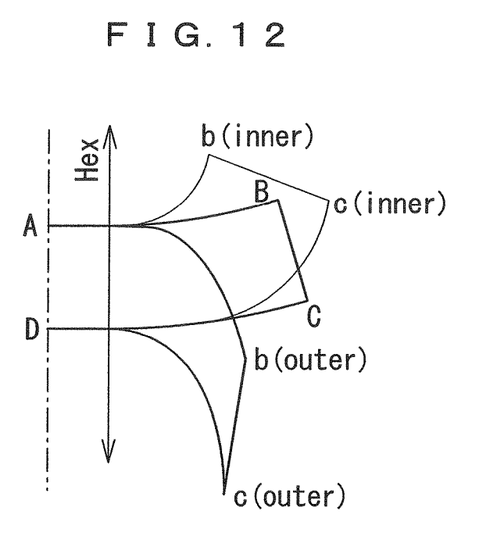
FIG. 12 is a third schematic diagram that indicates the control of a magnetized direction.

Based on Patent Documents 3 and 4 discussed hereinabove, defects of Non-Patent Document 2 in terms of manufacture of the magnetic poles seem to be solved. However, considering the outer rotor type motor or the permanent-magnet-field-type DC motor in the slotless (coreless) structure to which the present invention is subjected, the surface of the magnetic poles is an inner periphery but not an outer periphery. Accordingly, as shown in FIG. 12, compared to Non-Patent Document 3 that is subjected to the inner rotor type brushless motor, configuration to obtain anisotropic distributions will be remarkably differentiated. For example, in order to obtain an arc-segmented magnet (A-B-C-D) as shown in the coordinate of FIG. 12, Patent Documents 3 and 4 will perform plastic deformation from the position of coordinate value A-b(inner)-c(inner)-D by using rheology. However, in case of the outer rotor type brushless motor to which the present invention is subjected, a large deformation will be needed from the position of coordinate value A-b(outer)-c (outer)-D. Accordingly, compared to Non-Patent Documents 3 and 4, magnetic materials with prominently large deformability will be required. That is, reducing the volume fraction of the magnetic materials will be impossible while maintaining or improving energy density as disclosed in Non-Patent Documents 3 and 4, whereby the magnetic materials are mechanically impaired through deformation processes. Accordingly, the methods disclosed in Non-Patent Documents 3 and 4 cannot be directly applied.

As discussed hereinabove, compared to Non-Patent Documents 3 and 4, since the present invention is subjected to the outer rotor type brushless motor or the permanent-magnet-field-type DC motor that has pole surfaces on its inner periphery, not only can not be the method of Non-Patent Documents 3 and 4 directly applicable, yet larger energy density $(BH)_{max}$ is needed in order to expand magnetic resistance as a motor magnetic circuit, especially in a slotless structure.

Here, considering the study of rare earth-iron based magnetic materials regarding improvement of the above-described energy density $(BH)_{max}$, it seems that R. W. Lee et al. are the first individuals to introduce that an isotropic $Nd_2Fe_{14}B$ based bonded magnet with $(BH)_{max}$ of 72 KJ/m³ can be achieved by fixing a rapid solidification ribbon with $(BH)_{max}$ of 111 kJ/m³ with resin (referred to "R. W. Lee, E. G. Brewer, N. A. Schaffel, "Hot-pressed Neodymium-Iron-Boron magnets" IEEE Trans. Magn., Vol. 21, 1958 (1985)"). Since then, from the late of the 1980's to the present, the study of the isotropic rare earth magnetic materials, mainly concerned with rapid solidification of rare earth-iron based molten alloy, has been actively conducted. For example, including nanocomposite magnetic materials using an exchange coupling based on $Nd_2Fe_{14}B$-base or $Sm_2Fe_{17}N_3$-base, or also based on a fine structure of the $Nd_2Fe_{14}B$-base or the $Sm_2Fe_{17}N$-base in addition to αFe, FeB or $Fe_3B$-base, isotropic magnetic materials micro-controlling variable alloy structures are industrially applicable. Further, isotropic magnetic materials in different powder configurations are also industrially applicable. See, for example, Non-Patent Documents 5 to 8. Here, especially in Non-Patent Document 8, H. A. Davies et al. reported that $(BH)_{max}$ reaches to 220 kJ/m³ even in isotropy. However, $(BH)_{max}$ of isotropic magnetic materials industrially applicable is approximately 134 kJ/m³ m at the highest. Energy density $(BH)_{max}$ of isotropic $Nd_2Fe_{14}B$ bonded magnets that have been typically applied to small motors with less than approximately several watts is approximately 80 kJ/m³ m or less. That is, since R. W. Lee et al. have produced the isotropic $Nd_2Fe_{14}B$ based bonded magnet with $(BH)_{max}$ of 72 kJ/m³ with the ribbon with $(BH)_{max}$ x of 111 kJ/m³ in 1985, in view of advancement of $(BH)_{max}$, the advancement has been less than even 10 kJ/m³.

Accordingly, it would be difficult to expect the torque densification of a motor to which the present invention is subjected while waiting the advancement of the isotropic magnetic materials that increase energy densities.

NON-PATENT DOCUMENT 1: "Application of high performance magnets in small motors" written by J. Schulze, Proc. of the 18th international workshop on high performance magnets and their applications, published in 2004, pp. 908-915

NON-PATENT DOCUMENT 2: "Comparison of brushless motors having halback magnetized magnets and shaped parallel magnetized magnets" written by Y. Pang, Z. Q. Zhu, S. Ruangsinchaiwanich and D. Howe, Proc. of the 18th international workshop on high performance magnets and their applications, published in 2004, pp. 400-407

NON-PATENT DOCUMENT 3: "Preparation method of rare earth bonded magnets with continuously controlled anisotropy directions" written by F. Yamashita, K. Kawamura, Y. Okada, H. Murakami, M. Ogushi, M. Nakano and H. Fukunaga, Journal of Applied Physics, 101, 09K522 (2007)

NON-PATENT DOCUMENT 4: "Composite bonded magnets with controlled anisotropy directions prepared by viscous deformation technique" written by F. Yamashita, K. Kawamura, Y. Okada, H. Murakami, M. Ogushi, M. Nakano and H. Fukunaga, J. Magnetism Magn. Mater., Vol. 316, Issue 2, published in 2007, pp. e101-e104

NON-PATENT DOCUMENT 5: "Recent developments in Nd—Fe—B powder" written by B. H. Rabin and B. M. Ma, 120th Topical Symposium of the Magnetic Society of Japan, published in 2001, pp. 23-28

NON-PATENT DOCUMENT 6: "Recent powder development at magnequench" written by B. M. Ma, Polymer Bonded Mangets 2002, published in 2002

NON-PATENT DOCUMENT 7: "Structure and magnetic properties of $Nd_2Fe_{14}B$/FexB-type nanocomposites prepared by strip casting" written by S. Hirosawa, H. Kanekiyo, T.

Miyoshi, K. Murakami, Y. Shigemoto and T. Nishiuchi, 9th Joint MMM/INTERMAG, FG-05, published in 2004

NON-PATENT DOCUMENT 8: "Nanophase Pr and Nd/Pr based rare-earth-iron-boron alloys" written by H. A. Davies, J. I. Betancourt and C. L. Harland, Proc. of 16th Int. Workshop on Rare-Earth Magnets and Their Applications, published in 2000, pp. 485-495

DISCLOSURE OF THE INVENTION

The present invention, for example, relates to the manufacturing method of an annular magnet that satisfies that: the annular magnet has energy density of 160 kJ/m³ or more which is to be applied to an outer rotor type motor or a permanent-magnet-field-type DC motor including a slotless structure where the inner periphery of the annular magnet works as a pole surface; fragments of a segment are rearranged in such a manner as to turnover the U-shaped formation of the segment where anisotropic distributions are optionally given in a uniform magnetic field alignment and the opened direction of the annular magnet by 180 degrees; and the direction of anisotropy is mechanically and continuously controlled by recompressing the fragments. Accordingly, energy density $(BH)_{max}$, that has been the defect of the isotropic rare earth-iron based bonded magnet, can be enhanced two times or more, and at the same time, static magnetic fields generated by the magnet can be converged into stator core teeth, the air-core portion of an air-core winding, etc. Further, static magnetic fields generated from a pole surface placed on its inner periphery can be remarkably expanded as the magnetic flux linkage of a stator winding so as to increase the torque density of the motor.

Here, when considering a motor applying a radial anisotropic magnet that does not have a certain non-radial anisotropic region such as conventional in-plane anisotropy, while energy density $(BH)_{max}$ of a magnet is increased, a magnetized vector angle M θ (center) at the center of a magnetic pole relative to a mechanical radian φ and a magnetized vector angle M θ (edge) at the edge of a magnetic pole will be M θ (center)≈M θ (edge). Here, M θ/φ indicating the variation of the magnetized vector angle M θ near the edge of the magnetic pole relative to the mechanical radian φ tends to increase exponentially. However, considering M θ/φ of the present invention that indicates variation of the magnetized vector angle M θ near the edge of the magnetized pole edge relative to the mechanical radian, it is possible to suppress the M θ/φ less than an isotropic magnet by continuously controlling the direction of anisotropy. That is, the magnetized vector angle M θ at the edge of the magnetic pole relative to a tangent line in the inner periphery direction on a magnetic pole surface will be zero in a condition where a static magnetic interaction is superimposed between magnetic poles, and the M θ will be continuously and regularly changed up to 90 degrees as the function of the mechanical radian φ. Moreover, compared to a ferrite pole-anisotropy magnet or an isotropic $Nd_2Fe_{14}B$ magnet, the present invention can provide an annular magnet with high energy density of 160 to 186 kJ/m³, and with energy density $(BH)_{max}$ of approximately 2 to 10 times. Accordingly, for example, it would be possible to effectively enhance torque densities even in motors such as an outer rotor type motor in a slotless (coreless) structure increasing magnetic resistance in the magnetic circuit of the motors. Especially, even with a small caliber, there is no deterioration of energy density $(BH)_{max}$ like anisotropic magnets manufactured in a repulsive radial magnetic field alignment. Further, for example, it would be possible to concurrently manufacture a plurality of segments in transverse magnetic fields that keep uniform and regular directions. Accordingly, there can be found effectiveness especially in the miniaturization and the torque densification of an outer rotor type brushless motor with a slotless structure where a magnetic pole surface is provided at its inner periphery and a permanent-magnet-field-type DC motor.

| EXPLANATION OF REFERENCE NUMERALS | |
|---|---|
| φ: | Mechanical radian; |
| M θ: | Magnetized vector angle; |
| H θ: | Angle of external magnetic fields; and |
| Hex: | External magnetic fields |

BEST MODES FOR CARRYING OUT THE INVENTION

The present invention is subjected to a motor with a structure where the inner peripheral surface of an annular magnet is applied as a pole surface, the motor being, for example, an outer rotor type motor that includes a slotless (coreless) structure or a permanent-magnet-field-type DC motor. More specifically, the present invention relates to the manufacturing method of a rare earth-iron based annular magnet and a motor using the same where the magnet has energy density of 160 kJ/m³ or more, and the direction of anisotropy is mechanically and continuously controlled by recompressing a U-shaped segment to which the distribution of anisotropy is optionally provided in a uniform magnetic field alignment.

Hereinafter, the manufacturing method of an annular magnet according to the present invention will be explained in further details. First, the direction of uniform external magnetic fields Hex and optional positions of a segment, that is, the angle of a tangent line in an inner-and-outer peripheral direction relative to the mechanical radian $\phi$ of the annular magnet, is set to H $\theta$. A U-shaped segment is then molded in the magnetic fields of Hex, the U-shaped segment with inner-and-outer peripheral sections providing variation to H $\theta$ corresponding to the mechanical radian $\phi$. As a molding method, well-known injection methods or extrusion methods may be applicable; however, in order to make energy density $(BH)_{max}$ to be 160 to 180 kJ/m$^3$, compression methods in a transverse magnetic field would be preferable. Further, in order to provide the annular magnet having its inner periphery working as a pole surface by applying the U-shaped segment, a single or a plurality of U-shaped segment(s) is arranged at a cavity formed with dies and a center core at regular intervals according to a number of poles. The U-shaped segment is sent to an annular cavity with application of heat from one of the edge surfaces of the U-shaped segment in its thrust direction. Here, the segment is sent to the annular cavity as fragments, so that the fragments and the opened direction of the annular magnet can be each turned over by 180 degrees. Subsequently, the fragments that have been sent to the annular cavity are recompressed so as to continuously control the direction of anisotropy.

Here, an annularity that the present invention means includes a cylindrical shape, a circular shape, or unequal thickness of these shapes. Further, the plurality of U-shaped segments means at least two segments in an even number, and the specific formation thereof or the number of the segments for recompression depends on the number of magnetic poles whereby these rely on the designing ideas of a motor according to the present invention.

When rare earth-iron based magnetic materials according to the present invention are given with the external magnetic fields Hex in a condition where the magnetic materials are freely rotatable, the magnetic materials are magnetized and arranged in a direction of the external magnetic fields Hex. Accordingly, a magnetized vector angle M $\theta$ relative to optionally positioned peripheral tangent line on the inner-and-outer periphery of the section of the U-shaped segment, that is, the direction of anisotropy becomes M $\theta \approx$ H $\theta$.

In the present invention, in order to minimize tolerance between the magnetized vector angle M $\theta$ that indicates the direction of anisotropy and the angle H $\theta$, the U-shaped segment is set as that optional fragments with H $\theta$ are rotatively moved at optional positions of the mechanical radian $\phi$ so as to make only the direction of an isotropy varied without interfering the degree of anisotropy. The sectional formation of the U-shaped segment is then determined based on the aggregated body of these fragments. Further, the rotative movement where the aggregated body of the fragments with H $\theta$ relative to the optional positions of the mechanical radian $\phi$ makes only the direction of anisotropy varied without interfering the degree of anisotropy will apply rheology based on the shear flow or an extensional flow of melting linear polymers generated by heat and external forces, and also based on plastic deformation where the melting linear polymers are superimposed. In the outer rotor type motor or the permanent-magnet-field-type DC motor that includes slotless (coreless) structures to which the present invention is subjected to, the U-shaped segment that is the aggregated body of the fragments for obtaining anisotropic distributions and the opened direction of the annular magnet is differed by 180 degrees. Accordingly, in the present invention, the peripheral length of an inner periphery side, an outer periphery side or the both sides of the U-shaped segment is set to 1.03 to 1.15 based on the peripheral length of the annular magnet. The U-shaped segment is then transferred to the annular cavity while converting only the direction of anisotropy for each of the fragments of the U-shaped segment that includes molten giant molecular chains arranged at the predetermined positions of a forming die. The fragments are then recompressed from both sides thereof in a thrust direction so as to be converted into an annular aggregated body. Here, since the peripheral length of the inner periphery, the outer periphery or the both of the U-shaped segment is set to 1.03 to 1.15 based on the peripheral length of the annular magnet, when recompressed, the component of force will produce in a peripheral direction whereby each of the fragments where the direction of anisotropy has been converted will be recombined. Accordingly, it would be possible to obtain the rare earth-iron based annular magnet in the present invention where the direction of anisotropy is continuously controlled in a condition of M $\theta \approx$ H $\theta$ and also in a state of keeping energy densities. That is, the continuous control of anisotropy according to the present invention is different from the one disclosed in Non-Patent Documents 3 and 4 where an annular magnet is directly formed from segments. In the present invention, the U-shaped segment is designed and formed based on the aggregated body of the fragments. The segment is made to be the fragments, and following conversion of the anisotropic direction for each of the fragments, the annular magnet is obtained as the aggregated body of the fragments. Accordingly, if the direction of anisotropy for each fragment is controllable, it would be possible to increase the volume fraction of magnetic materials. That is, compared to energy density of 158 kJ/m$^3$ disclosed in Non-Patent Documents 3 and 4, further larger deformation of the U-shaped segment with 186 kJ/m$^3$ will be conductable.

Here, in case that the peripheral length of the U-shaped segment is less than 1.03 (exclusive) based on one of the annular magnet, when recompressed, peripheral component of force for the divided fragments will become deficient causing insufficient recombination of the fragments. On the other hand, when the peripheral length of the U-shaped segment is more than 1.15 (exclusive), the expansion-and-contraction ratio for the fragments become excessive deteriorating M $\theta \approx$ H $\theta$.

Next, as regards the directional control of anisotropy according to the present invention, appropriate anisotropic distributions will be explained. When considering the desirable formation of a continuous control of the direction of anisotropy according to the present invention, the following can be defined. In case that the mechanical radian corresponding to the effective magnetic flux linkage of stator winding where its origin is at the center of a rotary shaft is $\phi$s, and a mechanical radian at the pole center of the annular magnet where its origin is at the center of a rotary shaft is $\phi$r, at a region corresponding to $\phi$s $\approx \phi$r, the rotational direction of the magnetic pole, that is, the magnetized vector angle M $\theta$ relative to a tangent line in a peripheral direction is made 90 degrees providing a radial region. Further, an area from the above-described radial region extending to radial regions of adjacent magnetic poles (heteropolar) passing through both ends of the magnetic pole is set as a non-radial region. The magnetized vector angle M $\theta$ of this non-radial region and a mechanical radian $\phi$ corresponding to the non-radial region can be defined in the relation based on a first regression equation $\phi$=a×M $\theta$+b (a and b are coefficients). Here, it would be preferable that the correlation coefficient r of its regression line is set to 0.995 or more so as to enhance linearity. This means that the direction of anisotropy near the boundary of the magnetic poles becomes an in-plane anisotropy; however, as long as M $\theta$ at the ends of the magnetic pole is 5 degrees or less, by means of static magnetic mutual effects, the magnetized vector M θ between magnetic poles can retain its linearity.

Relative to the mechanical radian φ of the above-described magnetic poles, if the anisotropic direction M θ relative to a tangent line in its inner peripheral direction and its distribution are given, leakage flux components of static magnetic fields that generate the magnetic poles of the annular magnet for outer rotor type motors including a slotless structure can be diminished so as to be able to maximize the effective magnetic flux linkage of the stator wiring. In addition, at the non-radial regions, by making the correlation coefficient r of a regression equation providing the mechanical radian φ and the distribution of M θ to have accuracy of more than 0.995, it would be possible that static magnetic fields generating at the non-radial anisotropic region can be concentrated to the stator winding. Further, in the outer rotor type motor or the permanent-magnet-field-type DC motor that has stator core teeth, there can be found effects to reduce cogging torques or armature reactions.

Figure 1A:
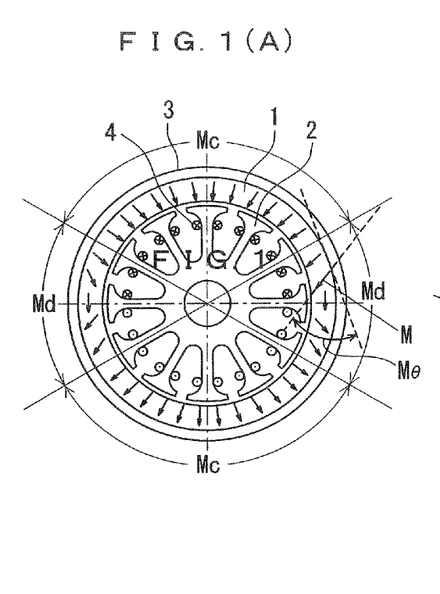
FIG. 1(A) is a schematic diagram of an anisotropic direction-control magnetic motor.
Figure 1B:
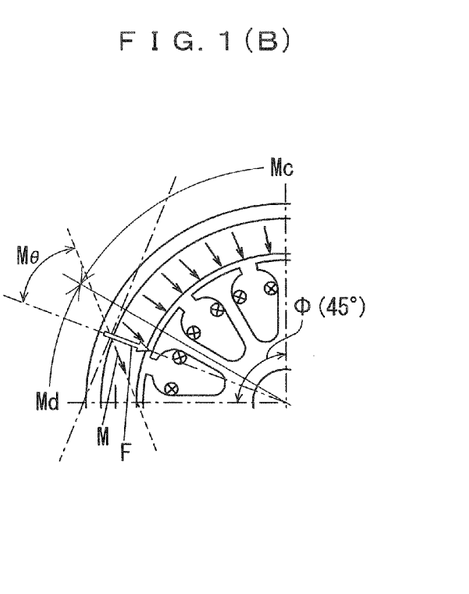
FIG. 1(B) is a schematic diagram that represents a relation between reaction due to armature reaction and the direction of anisotropy.

Here, in the armature reactions of the permanent-magnet-field-type DC motor, only the anisotropic direction of counterforce will be necessary to be considered. Accordingly, when the counterforce of the radial direction is set to F, F×cos M θ can be established. That is, as shown in FIGS. 1(A) and 1(B), by deviating the anisotropic direction M θ from 90 degrees, it would be possible to reduce the armature reactions in optional mechanical radians φ. In addition, since the length of its magnetic path becomes relatively longer, effects of not only the reduction of cogging torques but also the improvement of demagnetizing proof stress can be found. Here, in FIG. 1, a referential numeral 1 depicts two poles of an annular magnetic field according to the present invention; a radial anisotropic region at the center of the magnetic poll depicts Mc; a non-radial anisotropic region at the ends of the magnetic poles is Md; an anisotropic magnetization at optional positions depicts M; the direction of anisotropy is M θ (an angle defined by the magnetized vector M and a tangent line in a peripheral direction); a radial direction counterforce of armature reactions depicts F; and a mechanical radian depicts φ. Further, a referential numeral 2 depicts an armature core, and a referential numeral 3 depicts an iron frame that supports the annular magnetic field 1 according to the present invention and that forms a motor magnetic circuit along with the armature core 2. In addition, a referential numeral 4 depicts an armature winding that is wound around an armature core slot.

As discussed hereinabove, in the annular magnet according to the present invention, static magnetic fields generating at the magnetic poles can be further effectively applied as the effective magnetic flux linkage of stator windings or armature windings.

On the other hand, in order to enhance motor torque densities in the rare earth-iron based annular magnet according to the present invention where the direction of anisotropy is continuously controlled, the size of the static magnetic fields generating at the magnetic poles is also important. Accordingly, in the present invention, the deterioration of magnetic features through the manufacturing process of the annular magnet having the homogeneous direction and distribution of anisotropy, especially in the process manufacturing the annular magnet from the U-shaped segment, is limited. In the present invention, it would be possible to make the difference of remanence Mr between the U-shaped segment and a finished annular magnet to be 0.03 T or less, and to make the difference of an anisotropic dispersion σ to be less than 7% (exclusive). In addition, as the level of the static magnetic fields, it is allowed to set the remanence Mr of the anisotropic direction to be 0.95 to 1.05 T, coercivity HcJ to be 0.85 to 0.95 MA/m, and $(BH)_{max}$ to be 160 to 187 kJ/m³.

Furthermore, since the annular magnet according to the present invention is fabricated based on the U-shaped segment that has been molded in uniform magnetic fields, even if the annular magnet has a small caliber, its energy density $(BH)_{max}$ would not be deteriorated. Considering radial anisotropic magnets in general, when their diameters become approximately 25 mm or less, $(BH)_{max}$ decreases due to the decline of repulsive radial magnetic fields for alignment. Accordingly, in this type of a small motor, isotropic $Nd_2Fe_{14}B$ magnets of $(BH)_{max} \approx 80$ kJ/m³ are often used. However, the annular magnet of the present invention can more effectively work in miniaturization and torque densification for this type of conventional small motor. Still further, since the plurality of U-shaped segments can be molded at the same time, it is economically advantageous.

As discussed, in order to accomplish the configuration of the suitable U-shaped segment that can continuously control the direction of anisotropy where its inner periphery works as the surface of magnetic poles, and that can obtain energy density $(BH)_{max}$ of 160 to 187 kJ/m³, the following is applicable. That is, for example, $Nd_2Fe_{14}B$ based rare earth-iron based magnetic materials having 150 μm or less are formed in a macrostructure that is isolated with a matrix (a continuous phase) defined by $Sm_2Fe_{17}N_3$ based rare earth-iron based magnetic materials having average particles of 3 to 5 μm and a binder. More preferably, the volume fraction of the rare earth-iron based magnetic materials having energy density $(BH)_{max}$ of 270 kJ/m³ or more is set to 80 vol. % or more.

Figure 2A:
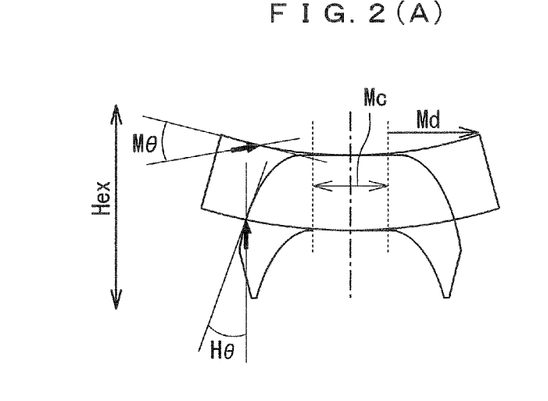
FIG. 2(A) is a first schematic diagram representing an anisotropic direction-control.
Figure 2B:
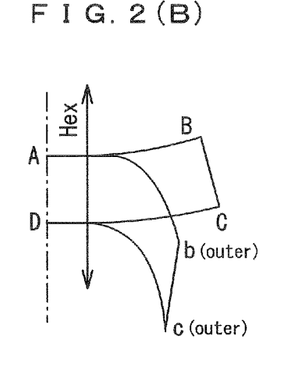
FIG. 2(B) is a second schematic diagram representing the anisotropic direction-control.

Considering the rare earth-iron based annular magnet according to the present invention that continuously controls the direction of anisotropy as discussed hereinabove, as firstly shown in FIG. 2(A), the U-shaped segment that has radial anisotropic regions and non-radial anisotropic regions is prepared. In the radial anisotropic regions, the distribution of an angle H θ defined by an external magnetic field Hex having a uniform direction and inner-and-outer peripheral section at optional positions is set to 90 degrees at the center portion of its magnetic pole. In the non-radial anisotropic regions, in order to be an in-plane anisotropy at the ends of the magnet in its peripheral direction, H θ is continuously altered based on the first regression equation from 90 degrees to the mechanical radian φ. Here, a coordinate A-b(outer)-c(outer)-D of FIG. 2(B) depicts the U-shaped segment, a coordinate A-B-C-D depicts the section of annular-shaped magnetic pole that is mounted on a motor, and H θ, M θ (Mc in the radial anisotropic regions, and Md in the non-radial anisotropic regions) are indicated. As shown in FIG. 2(A), M θ≈H θ is established.

As explained, the plurality of U-shaped segments according to the present invention are arranged on a circumference, and one end surface of the segment is heated and pressurized in its thrust direction so as to crush the segment into fragments, the fragments being sent to the annular cavity. The fragments that have been sent to the annular cavity are recompressed from their both end surfaces in an axial direction. Here, the fragments are thermo-compressed due to the component of force generating from a peripheral direction so as to be re-combined. The segment becomes crushed fragments through being sent to the annular cavity; however, the magnetized vector angle M θ that indicates the anisotropic direction of the crushed fragments will, as shown in FIG. 2(A), rotatively move as a rigid body. Accordingly, the annular magnet satisfies H θ and M θ corresponding to the distribution of the H θ.

Figure 3A:
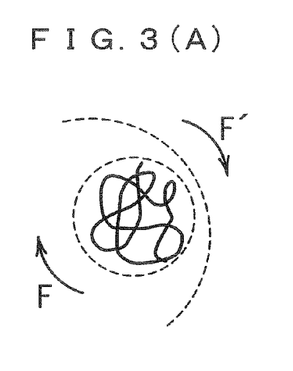
FIG. 3(A) is a first schematic diagram representing a flow configuration due to the external force of molten polymer.
Figure 3B:
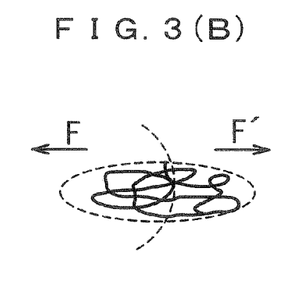
FIG. 3(B) is a second diagram representing a flow configuration due to the external force of molten polymer.

Here, when considering rheology of the present invention, as shown in the schematic diagrams of FIGS. 3(A) and 3(B), straight-chain giant molecular chain components that are included in resin compositions homogeneously stay in the interior of the U-shaped segment as filamentous molecular chains interwined in a melting conditions. The straight-chain giant molecular chain components will be subjected to plastic deformations such as shear flow or extensional flow according to the direction of external forces F-F'. Further, in the annular magnet according to the present invention, for example, resin composition components depicted in the FIG. 4 will be structured in a three-dimensional network structure by means of crosslinking reactions, and the aggregated body of segmented fragments will be integrally hardened. Accordingly, considering outer rotors or permanent magnet fields in which the magnet and the frame of the present invention are assembled, it would be possible to adjust a mechanical strength, a thermal resistance and durability.

Figure 4:
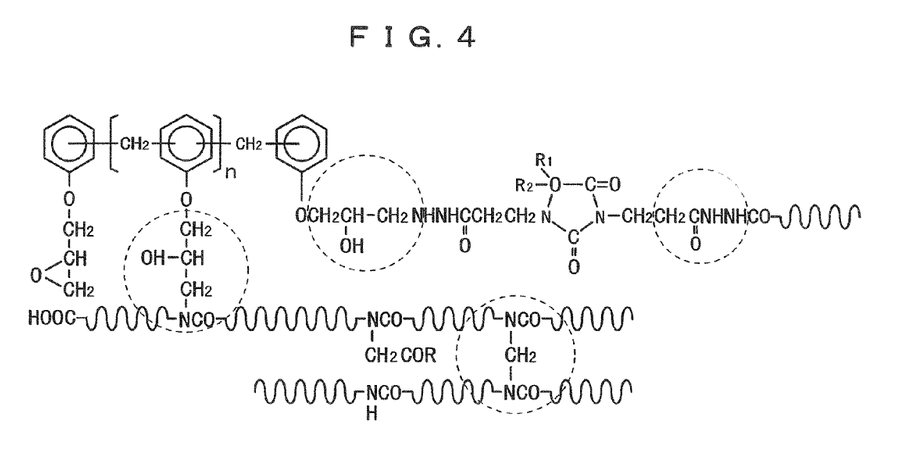
FIG. 4 is a mimetic diagram that indicates the molecular structure of a thermosetting resin composition providing rheology.

FIG. 4 depicts a schematic diagram showing the molecular structure of resin compositions that is composed of o-cresol novolac diglycidyl ether epoxy oligomer, filamentous polyamide, 2-phenyl-4,5-dihydroxymethylimidazole. FIG. 4 also indicates one example of the resin compositions adjusted so as to provide rheology to the magnet according to the present invention. Here, dotted circles shown in FIG. 4 depict the molecular structure of crosslinking portions. In the example of FIG. 4, when a filamentous polyamide is in a melting condition, the resin compositions homogeneously stay as the interwined filamentous giant molecular chains in a matrix composed of the U-shaped segment, the resin compositions being subjected to shear flow or extensional flow according to the external force F-F'. Further, the resin compositions will function when the segmented fragments are deformed while being sent to a molded cavity, or when fragments are thermocompressed to each other after being sent to the annular cavity. Here, the resin compositions that provide flow as shown in FIGS. 3(A) and 3(B) are not necessarily limited to what is shown in FIG. 4.

Here, the torque densities of outer rotor type motors, etc. including slotless (coreless) structures will be in proportion to static magnetic fields Ms that generate magnetic poles, that is, air-gap magnetic flux densities by a stator core and a magnet. Since the air-gap magnetic flux densities of the outer rotor type motor that is composed of the magnet and core with the same dimension and structure are supposed to approximately correspond to the square root of the ratio in the energy densities of the magnet, if the energy densities of poles according to the present invention is set to 160 kJ/m$^3$ or more relative to isotropic $Nd_2Fe_{14}B$ bonded magnets where the level of energy density $(BH)_{max}$ is up to approximately 80 kJ/m$^3$, it would be possible to expect the increase of the torque densities approximately 1.4 times more. Based on the above, considering the rare earth-iron based annular magnet according to the present invention where the direction of its anisotropy is continuously controlled, in view of enhancing its torque density, it would be preferable to have functions as that its remanence Mr is 0.95 T or more, and its energy density $(BH)_{max}$ is 160 kJ/m$^3$ or more, preferably 180 kJ/m$^3$ or more.

In order to obtain the above-described annular magnet according to the present invention where energy density $(BH)_{max}$ is identical to or greater than 160 kJ/m$^3$, it would be preferable that the volume fraction where the rare earth-iron based materials with energy density $(BH)_{max}$ of being equal to or greater than 270 kJ/m$^3$ is occupied in a magnet is set to 80 vol. % or more.

As the anisotropic rare earth-iron based magnetic materials according to the present invention, for example, RD (Reduction and Diffusion)—$Sm_2Fe_{17}N_3$ by A. Kawamoto (Published by A. Kawamoto, T. Ishikawa, S. Yasuda, K. Takeya, K. Ishizaka, T. Iseki, and K. Ohmori, "SmFeN magnet powder prepared by reduction and diffusion method", IEEE Trans. Magn., 35, Published in 1999, p3322), or so-called HDDR—$Nd_2Fe_{14}B$ Fabricated by T. Takeshita, et al. through hydrogenation of R2 (Fe, Co) 14B phase (Hydrogenation, R2[Fe, Co]14BHx), Phase Decomposition at 650 to 1000° C. (Decomposition, $RH_2+Fe+Fe_2B$), Dehydrogenation (Desorption), and Recombination (Published by T. Takeshita and R. Nakayama, "Magnetic Properties and micro-structure of the Nd—Fe—B magnet powders produced by hydrogen treatment", Proc. 10$^{th}$ Int. Workshop on Rare-earth Magnets and Their Applications, Published in 1989, pp. 551 to 562) can be mentioned.

EMBODIMENTS

Hereinafter, further detail explanations will be provided based on embodiments subjected to rare earth-iron based annular magnets according to the present invention where the direction of anisotropy is continuously controlled, and to outer rotor type motors with a slotless structure. The present invention is not, however, limited to the embodiments described hereinbelow.

Figure 5:
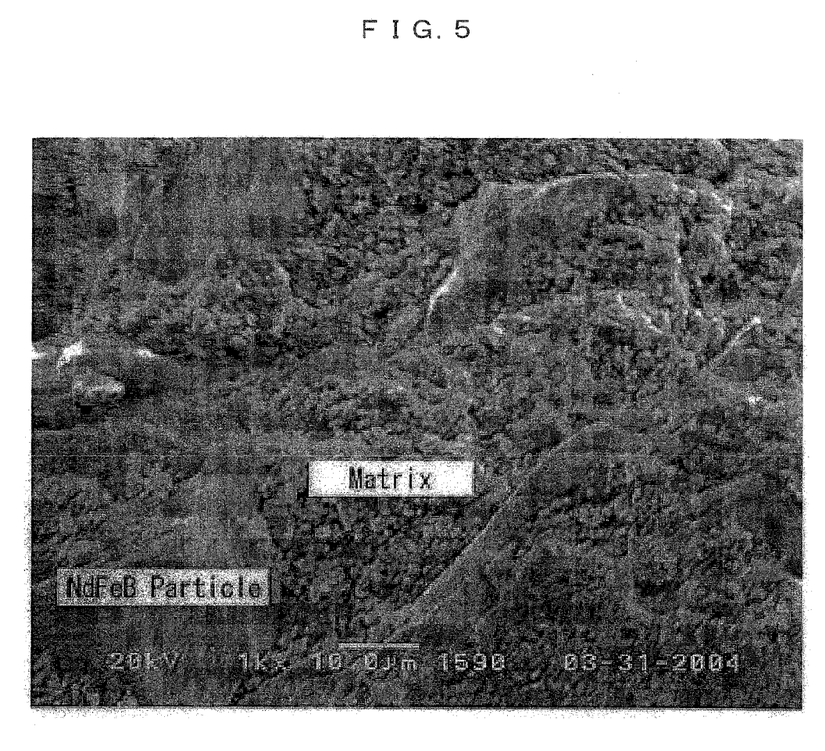
FIG. 5 is an electromicroscopic photo that represents the macrostructure of a magnetic anisotropy pole.

First, FIG. 5 is a photo taken with a scanning electron microscope (SEM) that depicts the macro structure of a magnet with density of 6.2 Mg/m$^3$ according to the present invention. Here, anisotropic $Sm_2Fe_{17}N_3$ based rare earth-iron based magnetic materials with a particle diameter of 3 to 5 μm and energy density $(BH)_{max}$ of 290 kJ/m$^3$, and anisotropic $Nd_2Fe_{14}B$ based rare earth-iron based magnetic materials with a particle diameter of 38 to 150 μm and energy density $(BH)_{max}$ of 270 to 300 kJ/m$^3$ are a segment where a transverse magnetic field with uniform external magnetic fields H θ of 1.4 MA/m is applied with heat of 160° C. along with resin compositions, and compression molding is conducted with a pressure of 20 to 50 MPa. As shown in FIG. 5, features of this magnet in a macro structure is as that $Nd_2Fe_{14}B$ based rare earth-iron based magnetic materials are isolated with a matrix (a continuous phase) composed of $Sm_2Fe_{17}N_3$ based rare earth magnetic powders and resin compositions. Further, a volume fraction occupied by $Sm_2Fe_{17}N_3$ and $Nd_2Fe_{14}B$ based rare earth-iron based magnetic materials is 80 vol. %.

Figure 6:
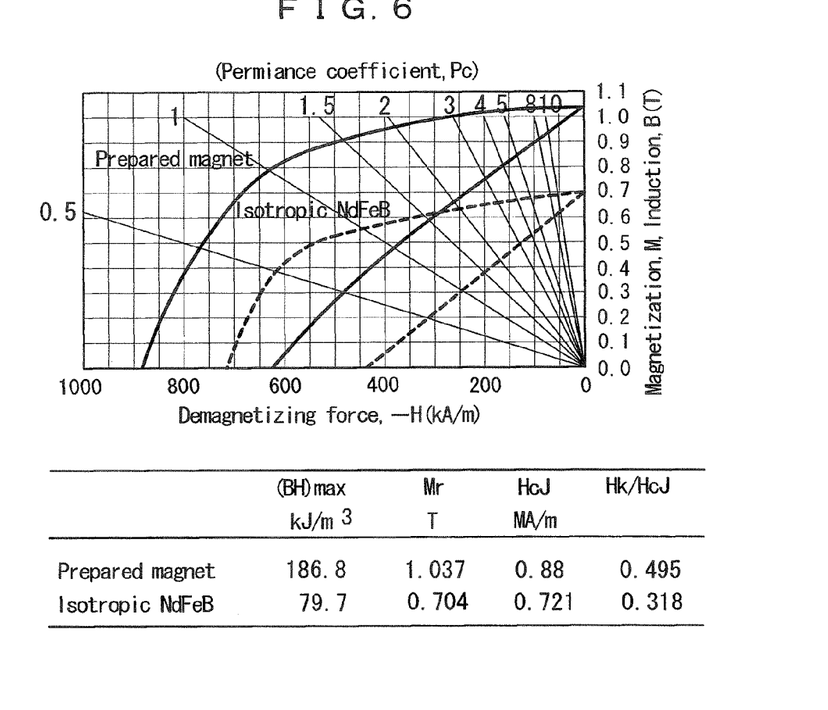
FIG. 6 is a characteristic diagram that indicates the demagnetization curve of a magnet.

FIG. 6 is a characteristic diagram that compares the demagnetization curve of a magnet (a prepared magnet) according to the present invention in which to have a macro structure as shown in FIG. 5 and typical magnetic properties with isotropic $Nd_2Fe_{14}B$ based magnets (Isotropic NdFeB). Here, a measured magnetic field is ±2.4 MA/m. As clearly shown in the FIG., compared to magnets with energy density of approximately 80 kJ/m$^3$ known as a magnet for outer rotor type motors to which the present invention is subjected, when applied in the present invention, energy density $(BH)_{max}$ goes beyond 160 kJ/m$^3$ and reaches to 187 kJ/m$^3$.

On the other hand, resin compositions are, as shown in FIG. 4, composed of a novolac-type epoxy oligomer with epoxy equivalent of 205 to 220 g/eq and a melting point of 70 to 76° C., a filamentous polyamide with a melting point of 80° C. and a molecular weight of 4000 to 12000, and 2-phenyl-4,5-dihydroxymethylimidazole. These materials will not reach to gelation while linear giant molecular chains are re-melted with heat and uniformly stay in the U-shaped segment as intertwined filamentous molecule chains. Even fragmented, these materials are subjected to shear flow or extensional flow according to the direction of heat and external forces as shown in FIG. 3. Accordingly, even if the segment is fragmented through a process fabricating the annular magnet from the U-shaped segment corresponding to FIGS. 2(A) and 2(B), the directional conversion of anisotropy is generated so as to recombine the fragments by recompression achieving continuous control of the direction of anisotropy.

Table 1 is coordinate values depicting the segment of the U-shaped segment having the above-described macro structure according to the present invention. Here, in the annular magnet as shown in FIGS. 2(A) and 2(B), the following is defined: its external radius is 9.6175 mm; its inner radius is 8.45 mm; and its opening angle is 30 degrees. That is, 12 pieces of the magnetic poles of the annular magnet where each inner periphery has 12 poles of pole surfaces are evenly connected in a peripheral direction so as to achieve an annular magnet with its outer diameter of 19.235 mm and its inner diameter of 16.90 mm. Here, as shown in FIGS. 2(A) and 2(B), the angle H θ defined by the uniform external magnetic fields Hex and the peripheral tangent line at optional positions of the U-shaped segment corresponds to the magnetized vector angle M θ relative to the inner-and-outer peripheral tangent lines at optional positions of the mechanical radians φ on the inner and outer periphery of the magnet. That is, H θ≈M θ. Here, as shown in FIGS. 2(A) and 2(B), the setting of angle H θ defined by the inner-and-outer tangent lines and the external magnetic fields Hex is performed as that: the inner periphery of the segment is 0.0512 mm pitch; and the outer periphery of the segment is 0.063 mm pitch. The segment is divided at the center of the pole in a radial direction and composed as the aggregated body of 96 fragments in total, and each fragment is adapted to move with rotation as a rigid body. Further, in this example, when setting the peripheral length of the poles of the annular magnet to 1, the peripheral length of the U-shaped segment on its external peripheral side is 1.096 whereby the peripheral pressure is adapted to act on each fragment at the time of recompression.

TABLE 1

| X (mm) | Y (mm) | X (mm) | Y (mm) |
|---|---|---|---|
| 0 | 0 | 0 | 1.142637 |
| 0.102901 | 0 | 0.105147 | 1.142858 |
| 0.154349 | 0 | 0.157718 | 1.142971 |
| 0.205795 | 0 | 0.210286 | 1.142975 |
| 0.257237 | 0 | 0.262851 | 1.142873 |
| 0.308674 | 0 | 0.315411 | 1.142663 |
| 0.360107 | 0 | 0.367966 | 1.142346 |
| 0.411535 | 0 | 0.420516 | 1.141924 |
| 0.462956 | 0 | 0.47306 | 1.141398 |
| 0.514371 | 0 | 0.525597 | 1.140768 |
| 0.565778 | 0 | 0.578126 | 1.140036 |
| 0.617177 | 0 | 0.630646 | 1.139205 |
| 0.668567 | 0 | 0.683158 | 1.138275 |
| 0.719947 | 0 | 0.735659 | 1.137248 |
| 0.771317 | 0 | 0.78815 | 1.136128 |
| 0.821996 | −0.01046 | 0.841218 | 1.141473 |
| 0.872392 | −0.02521 | 0.894168 | 1.141297 |
| 0.922327 | −0.04409 | 0.946819 | 1.135701 |
| 0.971633 | −0.067 | 0.999003 | 1.12481 |
| 1.020151 | −0.0938 | 1.050555 | 1.108769 |
| 1.067728 | −0.12438 | 1.101325 | 1.087747 |
| 1.114223 | −0.15859 | 1.151168 | 1.061932 |
| 1.159502 | −0.19633 | 1.199951 | 1.031529 |
| 1.203441 | −0.23747 | 1.247552 | 0.996761 |
| 1.245923 | −0.28187 | 1.293857 | 0.957869 |
| 1.286842 | −0.32943 | 1.338764 | 0.915105 |
| 1.326101 | −0.38 | 1.382183 | 0.868736 |
| 1.363609 | −0.43348 | 1.424034 | 0.819038 |
| 1.399289 | −0.48975 | 1.46425 | 0.766299 |
| 1.433068 | −0.54869 | 1.502774 | 0.710613 |
| 1.464886 | −0.61019 | 1.539563 | 0.652882 |
| 1.49469 | −0.67416 | 1.574583 | 0.592812 |
| 1.522436 | −0.74048 | 1.607815 | 0.53091 |
| 1.548088 | −0.80907 | 1.639251 | 0.467488 |
| 1.571622 | −0.87984 | 1.668893 | 0.402855 |
| 1.593021 | −0.95272 | 1.69676 | 0.33732 |
| 1.612278 | −1.02763 | 1.722878 | 0.271189 |
| 1.629396 | −1.02763 | 1.74729 | 0.204764 |
| 1.644386 | −1.02763 | 1.77005 | 0.138342 |
| 1.657273 | −1.02763 | 1.791229 | 0.072215 |
| 1.668091 | −1.02763 | 1.81091 | 0.006668 |
| 1.676891 | −1.02763 | 1.829197 | −0.05802 |
| 1.683737 | −1.02763 | 1.846216 | −0.12157 |
| 1.688721 | −1.02763 | 1.862122 | −0.18373 |
| 1.691967 | −1.02763 | 1.877116 | −0.24421 |
| 1.693679 | −1.02763 | 1.891496 | −0.30276 |
|  |  | 1.693679 | −1.02763 |

Figure 7:
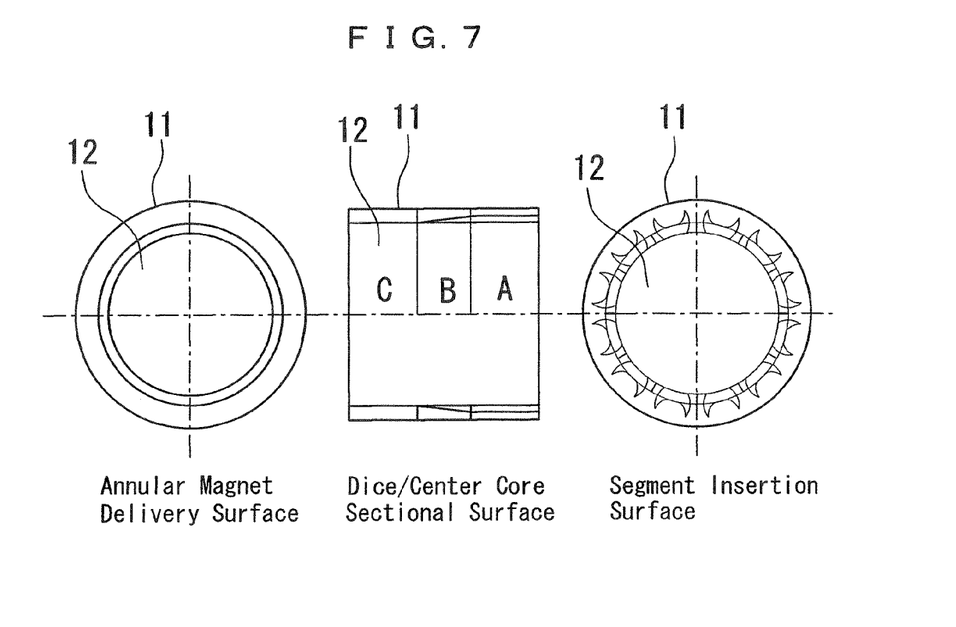
FIG. 7 is a perspective outline diagram that indicates a transport compression process.

Next, as shown in FIG. 7, from the segment insert surface of the cavity composed of a dice 11 and a center core 12 that have been heated at 160° C. in advance, the 12 U-shaped segments are each arranged at sectional surface A-portion in FIG. 7 at 360° C. at equal intervals, and are housed in the cavity. Here, giant molecular chains in the segment have been in a melting condition by heat. The U-shaped segments of a coordinate A-b(outer)-c(outer)-D shown in FIG. 2(B) will be then sent to a C-portion through the drawing portion of sectional surface B-portion of FIG. 7. At this stage, the U-shaped segments have been fragments in optional shapes due to mechanical crushes, and reach to the sectional surface C-portion of FIG. 7 as shown in a coordinate A-B-C-D while converting the direction of anisotropy. Here, through recompression, the circumferential pressure of the fragments is retrieved so as to thermocompress each of the fragments by means of axial pressure and circumferential pressure achieving the annular magnet. When the U-shaped segments are transported to the annular cavity, there can be found nearly no resistance; however, during the recompression, by adding the pressure of 20 to 60 Mpa, the fragments are adapted to be integrally rigidified through thermo-compression bonding due to not only the axial pressure but also the circumferential pressure.

Next, the annular magnets that are suitable for slotless (coreless) outer rotor type motors according to the present invention will be then subjected to heat treatments at 170° C. for 20 minutes in atmosphere after being released from a forming die. Accordingly, resin compositions have been crosslinked as shown in FIG. 4. Here, although free epoxies are shown in FIG. 4, it would be preferable that these are all rigidified through reaction by imidazoles, amino active hydrogen within linear polyamide molecular chains, or carboxyl termini.

Then, by applying a magnetic yoke with two turn/coil and pulse-magnetized power, firstly instantaneous high-magnetic-fields are applied to the above described 12-poles annular magnet by the pulsed-current crest value of Ip=10 kA. Accordingly, the annular magnet within the magnetic yoke is adapted to rotate according to the direction and distribution of anisotropy so as to mechanically adjust distribution position of anisotropy of the magnetic yoke and the annular magnet. The pulse field magnetization of Ip=25 kA is then applied so as to obtain the annular magnet of the present invention.

Figure 8:
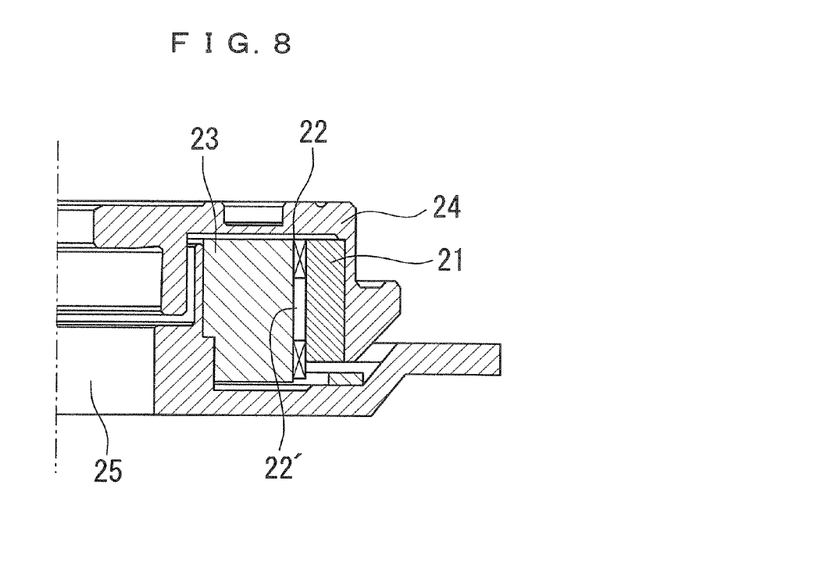
FIG. 8 is a sectional block diagram of an outer rotor type motor.

The annular magnet according to the present invention that has been obtained by the above method has the outer diameter of 19.23 mm, the inner diameter of 16.90 mm, the thickness of 1.165 mm, the length of 4.5 mm, concentricity of 0.01 mm or less, and circularity defined by difference between the maximum inner diameter and the minimum inner diameter of 0.02 mm or less. This annular magnet is assembled with an iron frame at the final stage so as to make a 12-pole outer type rotor, and then assembled with a stator through a rotary shaft making the outer rotor type motor of a slotless structure as shown in FIG. 8. Here, in the sectional block diagram of FIG. 8, a referential numeral 21 depicts an annular magnet having energy density $(BH)_{max}$ of 186 kJ/m³ according to the present invention where the direction of anisotropy is continuously controlled, a referential numeral 22 depicts an air-core stator winding that faces the magnet 1, a referential numeral 22' depicts the air-core portion of the stator winding, that is, a magnetic flux linkage portion, a referential numeral 23 depicts a so-called slotless stator core that supports the stator winding 22, a referential numeral 24 depicts an iron frame that forms a magnetic circuit along with the slotless stator core 23 and supports the magnet 21, and a referential numeral 25 depicts a rotary shaft. Accordingly, the structure of the annular magnet according to the present invention is as that a stator core is not provided with a slot in which a winding is housed, but an air-core winding is arranged along the outer peripheral surface of the stator core.

Figure 9:
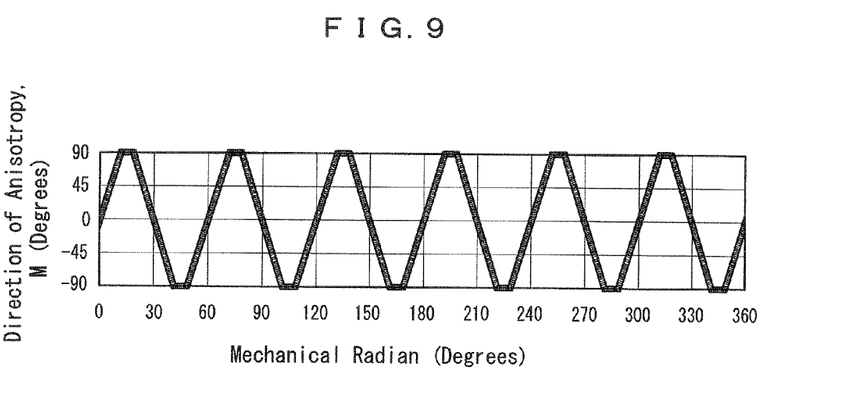
FIG. 9 is a characteristic diagram that indicates a relation between a mechanical radian and a magnetized vector.
Figure 10A:
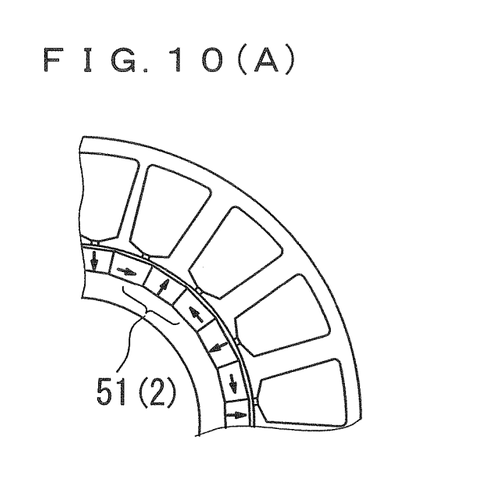
FIG. 10 is a first schematic diagram that indicates the control of a magnetized direction.
Figure 10B:
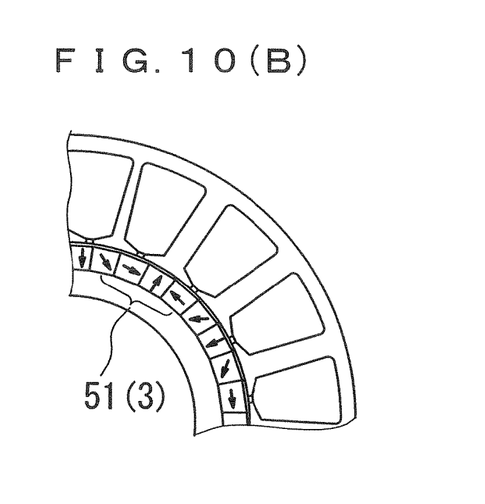
Figure 10C:
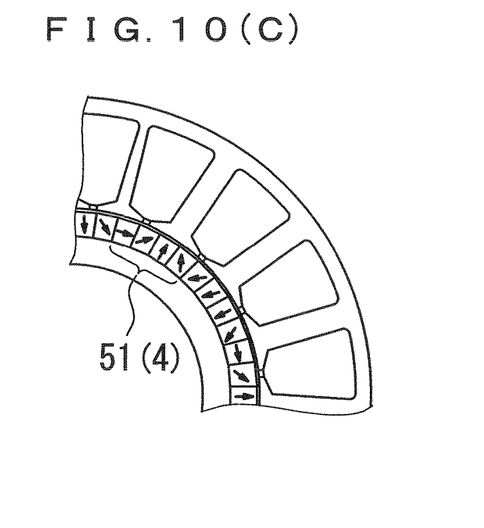
Figure 10D:
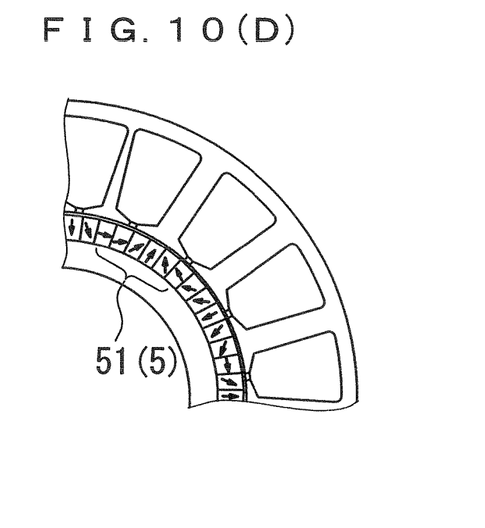

Next, in the present invention, as shown in FIG. 8, when the mechanical radian ϕ of a magnetic flux linkage portion 22' of the stator core is equal to 10 degrees, the mechanical radian ϕ of the magnetic pole of the annular magnet is equal to 30 degrees, a magnetized vector angle relative to the inner circumferential tangent line in radial regions at the center of magnetic poles is Mc, and a magnetized vector angle relative to the peripheral tangent line in non-radial regions besides the center is Md, as shown in FIG. 9, Mc=90 degrees. Here, considering the measurement of the magnetized vector M, assuming that a combined magnetized vector M in radial, tangent and axial directions indicates the direction of an easily-magnetized axis, the measurement has been performed by 25 points per 1 degree with a three-dimensional hall probe Tesla meter. Further, as to the evaluation of the magnetized vector M and its distribution, radial regions are based on an average angle error relative to 90 degrees, and non-radial regions are based on the correlation coefficient of a regression equation for Md relative to the mechanical radian ⟩. As a result, the average angle error at the radial regions is 3 degree or less, and the correlation coefficient of the regression equation for Md relative to the mechanical radian ϕ at the non-radial regions is 0.9976.

Then, as to the magnetic poles of the segments and the annular magnet, a cylindrical magnet with its diameter of 1 mm is taken from portions corresponding to H θ, Mc and Md relative to optional mechanical radians ϕ. Based on the cylindrical magnet, results analyzing the angle of anisotropy and its degree are then to be considered. First, when the center position of the cylindrical magnet is set to H θ, Mc and Md in the mechanical radian ϕ, the angle where the maximum magnetization Ms becomes the largest in the whole direction of the cylindrical magnet, that is, H θ, Mc, and Md relative to the mechanical radian ϕ is determined. As a result, the difference of a remanence Mr when the segments and the annular magnet are placed at the same position is 0.03 T or less.

On the other hand, the degree of anisotropy is evaluated by using an anisotropy dispersion σ. Here, the evaluation of the anisotropy dispersion σ, that is, the distribution of anisotropy direction (C-axis) is determined as follows. In the whole energy $E=Ku \cdot \sin^2 \phi - Ms \cdot H \cdot \cos(\phi-\phi_o)$ in a rotation magnetization, a solution minimizing the whole energy E of the cylindrical magnet, that is, ϕ is firstly determined from $(\delta E/\delta \phi)=Ku \cdot \sin 2\phi - Ms \cdot H \cdot \sin(\phi-\phi_o)=0$. Then, based on $M=Ms \cdot \cos(\phi_o-\phi)$, M-H loop that maximizes M will be measured by means of a vibrating sample magnetometer (VSM). Further, based on $Ku \cdot \sin 2\phi - Ms \cdot H \cdot \sin(\phi_o-\phi)=0$, ϕ is determined. By applying the probability distribution of ϕ, the whole condition of alignment, that is, the anisotropy dispersion σ is determined. Here, ϕo depicts the angle of external magnetic fields, ϕ depicts an angle where Ms has rotated, Ms depicts a spontaneous magnetic moment, Ku depicts a magnetic anisotropy constant, and E depicts the whole energy. As a result, when the center position of the cylindrical magnet is set to a setting angle M θ, the angle maximizing the remanence Ms in the whole direction of a cylindrical sample, that is, H θ relative to ϕ, Mc and Md become approximately identical, and the value of the anisotropy dispersion σ of the U-shaped segment and the annular magnet becomes 7% or less at the maximum considering as identical if measuring errors are taken account of. The above proves that in the process where the U-shaped segment has been fragmented so as to obtain the annular magnet according to the present invention by recompression, only the direction of anisotropy is changed without deteriorating the degree of anisotropy, that is, energy density $(BH)_{max}$ when each portions are rotatively moved.

On the other hand, in the process where the U-shaped segment is fragmented and recompressed so as to make the annular magnet according to the present invention, the variation of anisotropy due to the expansion and contraction of the magnet has been studied. To be more specific, a magnet having the thickness of 1 mm is subjected to a hot rolling at 160° C. Here, the thickness variation has been determined as an expansion-and-contraction rate, and evaluations have been conducted through samples based on different expansion-and-contraction rates. In the evaluations, based on M-H loop that is measured by the vibrating sample magnetometer (VSM), the maximum magnetization Mmax⊥ in a perpendicular direction and the maximum magnetization Mmax// in an In-plane direction have been determined so as to achieve the ratio of Mmax⊥Mmax//. Here, since Mmax⊥Mmax// has strong demagnetizing fields in a direction perpendicular to a plane, Mmax⊥Mmax// of isotropy magnets without correction of the demagnetizing fields is 0.9. Based on the above, if Mmax⊥Mmax// is 0.9 or more, it can be said that anisotropification toward a perpendicular direction is achieved. Further, as Mmax⊥Mmax// is becoming larger, it means that the anisotropification toward the perpendicular direction is becoming larger. Here, the average value of Mmax⊥Mmax// at the expansion-and-contraction rate of 0% is 1.51, and as the expansion-and-contraction rate is increased, its average value is decreased. However, when testing the difference between population variance and population mean of Mmax⊥Mmax// at the expansion-and-contraction rate of 0% and 10%, Fo=4.83<F(4, 4; 0.025)=9.60 and to=0.679<t(8, 0.10)=1.860 can be determined. Here, there can be found no difference therebetween since its significant level is 5%. Accordingly, in the process of forming the annular magnet from the U-shaped segment, there can be found no variation in the degree of anisotropy as long as the expansion-and-contraction rate is 10% or less.

Along with comparative examples, the table 2 indicates the torque constant Kt of an outer rotor type motor in a slotless structure to which the annular magnet according to the present invention in FIG. 8 is applied. Here, a comparative example 1 shows an arc segmented $Sm_2Fe_{17}N_3/Nd_2Fe_{14}B$ magnet having energy density of 186 kJ/m³ in a parallel orientation, and a comparative example 2 shows an annular NdFeB magnet having energy density of 80 kJ/m³ with sine wave magnetization. The magnetic properties thereof will correspond to FIG. 6. In the comparative example 2, isotropic $Nd_2Fe_{14}B$ magnets that are known as the magnets for this type of a compact motor are considered, and Kt based on the comparative example 2 will be 1.42 in the comparative example 1 while Kt based on the embodiment of the present invention is 1.52.

TABLE 2

|  | The Present Invention | Comparative Example 1 | Comparative Example 2 |
|---|---|---|---|
| Kt (mNm/A) | 5.78 | 5.41 | 3.70 |
| Ratio | 1.56 | 1.46 | 1.00 |

In the formation of FIG. 8, the portion of the stator winding, that is, air-gap magnetic flux densities due to static magnetic fields generated by a magnet approximately corresponds to the square root of ratio of the energy density of a magnet. Further, since a motor constant Kj is the ratio of a square root defined by the output torque Kt and ohmic loss, the ratio of Kt defined by the comparative examples 1 and 2 will reflect the square root of the ratio of energy density for a magnet. Accordingly, there can be found no magnetic saturation in the stator core. In the embodiment of the present invention, compared to the comparative example 1 in the parallel orientation, the direction of anisotropy is continuously controlled toward the air-core portion of the stator winding whereby Kt is improved by 1.07 times compared to the comparative example 1. That is, although magnet energy density of a magnet of the embodiment of the present invention and the comparative example 1 as shown in FIG. 6 is 186.7 kJ/m$^3$, in consideration of Kt, energy density of the magnet according to the present invention appears to improve to obtain the magnetic flux linkage amount of approximately 200 kJ/m$^3$ because of the continuous control of the direction of anisotropy, contributing to improvement of torque densities.

As discussed hereinabove, in the present invention, by providing the manufacturing method of anisotropic annular magnets, it would enhance energy density (BH)$_{max}$ by two times more which was deficient of isotropic magnets whereby it would increase the torque density of the outer rotor type motor or the permanent-magnet-field-type DC motor. Further, in the present invention, with an identical formation, the direction of anisotropy is continuously controlled toward the air-core portions of the stator winding, the portions of the stator core teeth and the armature core teeth. Accordingly, the properties of the radial anisotropic magnets (including the magnets in parallel orientation) that have high energy densities can be effectively reflected to motor performances of the outer rotor type motor, the slotless outer rotor type motor or the permanent-magnet-field-type DC motor.

INDUSTRIAL APPLICABILITY

The improvement of torque densities, miniaturization and weight saving for outer rotor type motors or permanent-magnet-field-type DC motors according to the present invention can be efficiently achieved by the high energy densification of a magnet. However, the torque pulsation or the armature reaction of motors will negatively influence for the above improvement. Further, when applying a slotless (coreless) structure in order to eliminate the torque pulsation or the armature reaction, the magnetic resistance of motor magnetic circuits will be enhanced. For solving the above problems, there is provided an annular magnet that is opened in a reverse direction relative to the opening direction of a U-shaped segment fabricated in constantly directed magnetic fields. Accordingly, it would be possible to provide the annular magnet having an anisotropic distribution where angles relative to inner peripheral tangent lines can be continuously changed in the range of approximately 0 to 90 degrees, and having energy density (BH)$_{max}$ being equal to 160 to 186 kJ/m$^3$. With this structure, it would be possible to apply to the outer rotor type motors or the permanent-magnet-field-type DC motors where its inner periphery works as the surface of magnetic poles being able to highly apply to industries.

The invention claimed is:

1. A manufacturing method of a rare earth-iron based annular magnet, comprising the steps of:
arranging a predetermined number of U-shaped segments at a molded cavity, the U-shaped segments being as an aggregated body of fragments in magnetic fields Hex in which to retain an inner-and-outer peripheral section providing variation of H θ corresponding to a mechanical radian ϕ when H θ is an angle defined by a uniform direction of external magnetic fields Hex and a tangent line in inner and outer peripheral directions that corresponds to optional mechanical radians ϕ of an annular magnet;
making the segments fragmented and transporting the fragments to an annular cavity that opens in an inverse direction relative to the segments, the fragments being transported along with rotation satisfying H θ≈Mθ when H θ is set to the angle defined relative to the tangent line in the inner and outer peripheral direction that corresponds to the optional mechanical radians ϕ of the annular magnet, and when a direction of anisotropy is set to M θ;
recompressing the fragments at the annular cavity so as to recombine each of the fragments; and
making anisotropic direction M θ to be continuously varied relative to the mechanical radian ϕ of magnetic poles.

2. The manufacturing method of the rare earth-iron based annular magnet according to claim 1, wherein a peripheral length of the U-shaped segment in its inner periphery, outer periphery or both is set within 1.03 to 1.15 based on a peripheral length of the annular magnet.

3. The manufacturing method of the rare earth-iron based annular magnet according to claim 1, wherein the U-shaped segment of the annular magnet in which each fragment is thermo-compressed and recombined has an expansion-and-contraction rate of 10% or less.

4. The manufacturing method of the rare earth-iron based annular magnet according to claim 1, wherein remanence Mr is 1 T or more, and energy density (BH)$_{max}$ is 180 kJ/m$^3$ or more.

5. The manufacturing method of the rare earth-iron based annular magnet according to claim 1, wherein the annular magnet has a diameter of 20 mm or less and a thickness of 1.2 mm or less.

6. An outer rotor type motor comprising the rare earth-iron based annular magnet manufactured by the method of claim 1, wherein the outer rotor type motor having anisotropic distributions where, when a mechanical radian ϕ of an annular magnet facing to teeth portions of a stator core is set to a radial anisotropic region, a direction of anisotropy in a non-radial anisotropic region defined from the radial anisotropic region to ends of poles is continuously varied in a range defined with angles of less than 5 degrees to 90 degrees relative to a tangent line in an inner periphery.

7. A slotless outer rotor type motor comprising the rare earth-iron based annular magnet manufactured by the method of claim 1, the slotless outer rotor type motor having anisotropic distributions where, when a mechanical radian of an annular magnet facing to air-core portions of an air-core winding is set to a radial anisotropic region, a direction of anisotropy in a non-radial anisotropic region defined from the radial anisotropic region to ends of poles is continuously varied in a range defined with angles of less than 5 degrees to 90 degrees relative to a tangent line in an inner periphery.

8. A permanent-magnet-field-type DC motor comprising the rare earth-iron based annular magnet manufactured by the method of claim 1, the permanent-magnet-field-type DC motor having anisotropic distributions satisfying that, when counterforce due to armature reaction in a radial direction is set to F, according to necessity, a radial anisotropic region M θ is set to an angle of 90 degrees—θ so as to reduce the armature reaction, and an anisotropic direction M θ in a non-radial anisotropic region is continuously varied in an optional range defined with angles of less than 5 degrees to 90 degrees relative to a tangent line in an inner periphery.

* * * * *